(12) United States Patent
Kim et al.

(10) Patent No.: US 12,051,830 B2
(45) Date of Patent: Jul. 30, 2024

(54) ELECTROCHEMICAL CELL CHROMIUM POISONING PREVENTION MATERIALS

(71) Applicant: Robert Bosch GmbH, Stuttgart (DE)

(72) Inventors: Soo Kim, Fremont, CA (US); Tilman Miehle, Waiblingen (DE); Andrea Di Benedetto, Loechgau (DE); Karl-Otto Englert, Gundelsheim (DE); Mordechai Kornbluth, Brighton, MA (US); Jonathan Mailoa, Cambridge, MA (US); Charles Tuffile, Swansea, MA (US)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/708,695

(22) Filed: Mar. 30, 2022

(65) Prior Publication Data

US 2023/0317972 A1 Oct. 5, 2023

(51) Int. Cl.
*H01M 8/0217* (2016.01)
*H01M 4/86* (2006.01)

(52) U.S. Cl.
CPC ....... *H01M 8/0219* (2013.01); *H01M 4/8657* (2013.01); *H01M 2004/8689* (2013.01)

(58) Field of Classification Search
CPC ............. H01M 8/0219; H01M 4/8657; H01M 2004/8689
See application file for complete search history.

(56) References Cited

U.S. PATENT DOCUMENTS

| | | | |
|---|---|---|---|
| 5,942,349 A | * | 8/1999 | Badwal ............... H01M 8/0228 429/513 |
| 8,106,375 B2 | | 1/2012 | Chen et al. |
| 8,178,254 B2 | | 5/2012 | Inoue et al. |
| 8,586,251 B2 | | 11/2013 | Mai et al. |
| 9,115,032 B2 | | 8/2015 | Seabaugh et al. |
| 9,559,366 B2 | | 1/2017 | He et al. |
| 9,806,345 B2 | | 10/2017 | Qiu et al. |
| 10,411,267 B2 | | 9/2019 | Gumeci et al. |
| 10,547,073 B2 | | 1/2020 | Pillai et al. |

(Continued)

FOREIGN PATENT DOCUMENTS

| WO | WO2008/083788 | * 7/2008 | ............... H01M 8/02 |
|---|---|---|---|
| WO | 2013130515 A1 | 9/2013 | |

OTHER PUBLICATIONS https://materials.springer.com/isp/crystallographic/docs/sd_1715880 (Year: 2023).*

(Continued)

*Primary Examiner* — Helen Oi K Conley
(74) *Attorney, Agent, or Firm* — BROOKS KUSHMAN P.C.

(57) ABSTRACT

An electrochemical cell component including a bulk portion and a surface portion comprising a chromium getter multi-elemental oxide material having a formula (I): $A_xB_yO_z$ (I), where A is Ba, Ca, Cr, Mg, or Sr, B is Al, Bi, C, Co, Cr, Fe, Mn, Ni, Ti, Y, or Zn, x is a number selected from 1 to 8, y is a number selected from 1 to 64, and z is a number selected from 1 to 103, the multi-elemental oxide being configured to prevent chromium poisoning of the component.

7 Claims, 3 Drawing Sheets

(56) References Cited

U.S. PATENT DOCUMENTS

| 2016/0072143 A1* | 3/2016 | Singh ................ H01M 8/12 |
| | | 429/410 |
| 2019/0305332 A1 | 10/2019 | Onuma et al. |
| 2020/0194807 A1 | 6/2020 | Noh et al. |
| 2021/0257640 A1 | 8/2021 | Hiraiwa et al. |

OTHER PUBLICATIONS

P. Singh, "Materials and Approaches for the Mitigation of SOFC Cathode Degradation in SOFC Power Systems," Jul. 19, 2016, Center for Clean Energy Engineering, www.energy.uconn.edu.
A. Aphale et al., "Development and Validation of Chromium Getters fro Solid Oxide Fuel Cell Power Systems," Journal of Visualized Experiments, May 2019, pp. 1-8.

* cited by examiner

ELECTROCHEMICAL CELL CHROMIUM POISONING PREVENTION MATERIALS

TECHNICAL FIELD

The present disclosure relates to materials and systems to be utilized for prevention of chromium contamination and/or poisoning of chemical and electrochemical cells and their components, and methods of producing and using the same.

BACKGROUND

Fuel cells are at the forefront of power generation technology as they benefit the public by minimizing emissions such as $NO_x$. Fuel cell systems such as proton exchange membrane fuel cell (PEMFC) may be applicable for automotive applications, other fuel cells are typically intended for stationary applications. Fuel cells, in general, are attractive because they feature a relatively high combined heat and power efficiency, long-term stability, fuel flexibility, and low emissions. But fuel cells stacks may operate at relatively high temperatures and have corrosive environment. Hence, the fuel cell construction materials are chosen to withstand the hostile conditions. Among the materials are chromium-rich materials such as stainless steel. Yet the chromium contained in the materials may be oxidized to form gaseous species which may be a contributing factor to unwanted fuel cell degradation.

SUMMARY

In at least one embodiment, an electrochemical cell component is disclosed. The component includes a bulk portion. The component further includes a surface portion comprising a multi-elemental oxide material having a formula (I):

$$A_xB_yO_z \qquad (I),$$

where
A is Ba, Ca, Cr, Mg, or Sr, or a combination thereof,
B is Al, Bi, C, Co, Cr, Cu, Fe, Mn, Ni, Ti, Y, or Zn, or a combination thereof,
x is a number selected from 1 to 8,
y is a number selected from 1 to 64, and
z is a number selected from 1 to 103.

The multi-elemental oxide material may be configured to prevent chromium poisoning of the component. The material excludes $SrNiO_3$, $BaTiO_3$, $SrCO_3$, $BaAl_2O_4$, $MgMn_2O_4$, and $Na_2CO_3$. The multi-elemental oxide material may be a chromium scavenger chemically reactive towards a chromium vapor species. The material may be structured to form a benign non-poisoning product with the chromium vapor species. The multi-elemental oxide material may include a ternary oxide. The multi-elemental oxide material may form a physical barrier inert towards chromium vapor species including $CrO_3$, $CrO(OH)_2$, and/or $CrO_2(OH)_2$. The bulk portion may include $Al_2O_3$. The component may be a cathode. The surface portion may include a mixture of at least two multi-elemental oxides of the formula (I).

In another embodiment, an electrochemical system is disclosed. The system includes a chromium-containing surface. The system further includes a component having a bulk portion and a surface portion, the surface portion comprising a chromium vapor scavenger having a formula (I):

$$A_xB_yO_z \qquad (I),$$

where
A is Ba, Ca, Cr, Mg, or Sr, or a combination thereof,
B is Al, Bi, C, Co, Cr, Cu, Fe, Mn, Ni, Ti, Y, or Zn, or a combination thereof,
x is a number selected from 1 to 8,
y is a number selected from 1 to 64, and
z is a number selected from 1 to 103, The system may have a first state of releasing chromium vapor species from the chromium-containing surface and a second state of the scavenger of formula (I) scavenging the chromium vapor species and forming a material binding the chromium from the chromium vapor species. The system may further include a third state of regenerating the scavenger by removing the material by one or more gas agents. The material binding the chromium from the chromium vapor species may have a formula (IV):

$$M_xCr_yO_z \qquad (IV),$$

where
M is an alkaline earth metal, a post-transition metal, or a transition metal, and
x, y, z is each independently any number between 1 and 12.

The scavenger may include at least two different compounds of the formula (I). The scavenger may include nanoparticles in the size of about 0.1-1 µm. The scavenger may have a cubic crystal structure. The electrochemical system may be a fuel cell.

In yet another embodiment, a fuel cell component is disclosed. The component may include a bulk material. The component may also include a surface portion including one or more compositions having a formula (IV):

$$M_xCr_yO_z \qquad (IV),$$

where
M is an alkaline earth metal, a post-transition metal, or a transition metal, and
x, y, z is each independently any number between 1 and 12, The one or more compositions may be chemically non-reactive against chromium vapor species including $CrO_3$, $CrO(OH)_2$, and $CrO_2(OH)_2$. M may be Ca, Mg, Ni, Y, or Bi. The one or more compositions may form a continuous layer. The one or more compositions may include $CaCrO_4$. The component may be a cathode. The component may be located adjacent to a chromium-rich surface releasing the chromium vapor species.

DETAILED DESCRIPTION

Figure 1:
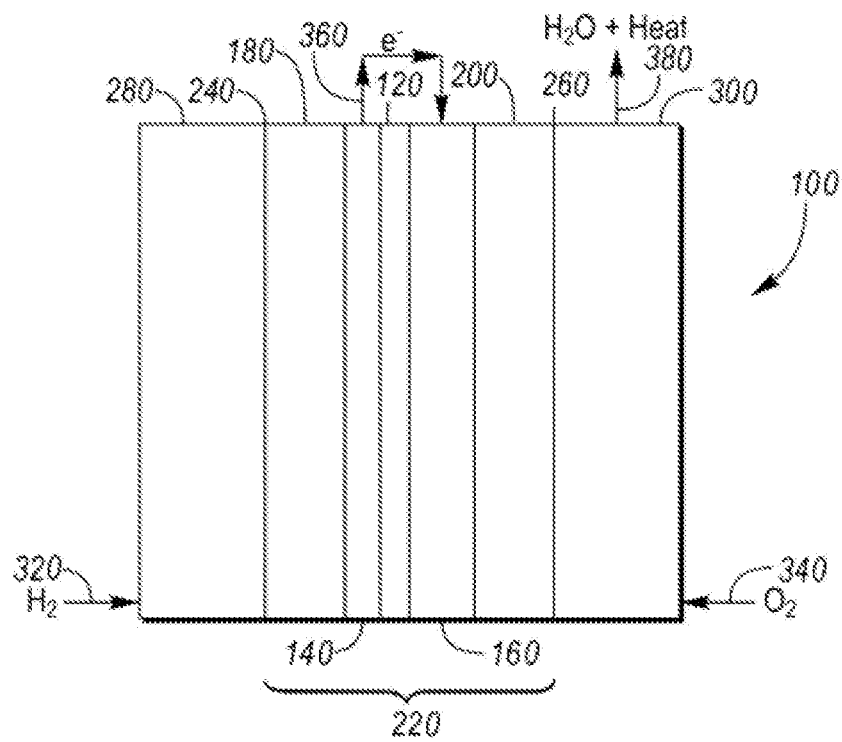
FIG. 1 shows a schematic depiction of a fuel cell.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures. The terms "compound" and "composition" are used interchangeably.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially" of limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fuel cells, or electrochemical cells, that convert chemical energy of a fuel (e.g. $H_2$ and also other types of hydrocarbons) and an oxidizing agent into electricity through a pair of electrochemical half (redox) reactions, have become an increasingly popular alternative to traditional batteries. Several different types of fuel cells have been developed to cover applications such as automotive, portable power systems, smartphones, combined heat and power, or backup power generation.

A typical single fuel cell is composed of an electrolyte membrane (EM), an anode layer, a cathode layer and gas diffusion layers. These components form a membrane electrode assembly (MEA), which is surrounded by two flow-field plates. FIG. 1 depicts a schematic, side view of a non-limiting example of a fuel cell 100. Fuel cell 100 includes EM 120, anode layer 140, cathode layer 160 and first and second gas diffusion layers (GDLs) 180 and 200. EM 120 is situated between anode layer 140 and cathode layer 160. Anode layer 140 is situated between first GDL 180 and EM 120 and cathode layer 160 is situated between second GDL 200 and EM 120. EM 120, anode 140, cathode 160 and first and second GDLs 180 and 200 comprise MEA 220. First and second sides 240 and 260 of MEA 220 are bounded by flow fields 280 and 300, respectively. Flow field 280 supplies $H_2$ to MEA 220, as signified by arrow 320. Flow field 300 supplies $O_2$ to MEA 220, as signified by arrow 340. A catalyst material is used in anode layer 140 and cathode layer 160. The fuel cell functions on the principles described by the following reaction $H_2 + \frac{1}{2}O_2 \rightarrow H_2O + 1.23$ eV. The cells such as the cell 100 depicted in FIG. 1 are typically combined into stacks to provide a desired amount of voltage.

Fuel cells have numerous advantages including high combined heat and power efficiency, long-term stability, fuel flexibility, and low emissions. Some electrochemical cells may have fuel flexibility. For example, a fuel cell may reform methane or use carbon monoxide as a fuel. Some electrochemical cells may also tolerate fuel impurities such as ammonia and chlorides.

Yet, electrochemical cells typically operate at high operating temperature which may result in longer start-up times and mechanical and chemical compatibility issues. For example, high-temperature electrochemical cells may operate in temperature ranges of up to about 1,000 to 1,200 K or 750 to 950° C., which means that the components of the stack need to be made from durable materials capable of withstanding high temperatures and corrosive environment.

The durable material may include steel such as chromium (Cr)-rich steel due to its high electronic conductivity, corrosion resistance, and machinability. A non-limiting example of the chromium steel is 1.4509, AISI 441, X2CrTiNb 18 steel that contains about 18 wt. % of Cr. Such stainless steel typically has $Cr_2O_3$ oxide materials at the surface. During the high temperature operation of an electrochemical cell, $Cr_2O_3$ may react with oxygen ($O_2$) and/or water ($H_2O$) that may form chromium vapors as described in Reactions 1-3 below:

$$Cr_2O_3 + 1.5 O_2 \rightarrow CrO_3 \quad \text{(Reaction 1)}$$

$$2Cr_2O_3 + O_2 + 4H_2O \rightarrow 4CrO(OH)_2 \quad \text{(Reaction 2)}$$

$$Cr_2O_3 + 1.5 O_2 + 2H_2O_2 \rightarrow CrO_2(OH)_2 \quad \text{(Reaction 3)}$$

These Cr vapors, namely, $CrO_3$, $CrO(OH)_2$, and $CrO_2(OH)_2$, may further react with oxide materials (e.g., cathode) in various fuel cell components that may further poison and thus reduce the fuel cell longevity, performance, or both. For example, the Cr vapors may lead to cathode degradation which may affect long-term stability of the fuel cell stacks.

$SrNiO_x$-coated $Al_2O_3$ fiber was identified as a "chromium getter" material. A "chromium getter" material relates to a material which may capture the undesirable chromium vapors so that chromium present in the fuel cell system does not release during oxidation, and does not increase degree of cathode and/or other degradation. The $SrNiO_x$ was shown to form a stable $SrCrO_4$ product on the surface of $Al_2O_3$ fiber support.

Since the $SrNiO_x$-coated $Al_2O_3$ fiber may not be applicable or functional in every application, it is desirable that additional chromium getter materials are identified for use in electrochemical cells. Additionally, there is a need for a Cr getter material with higher effectiveness than the $SrNiO_x$-coated $Al_2O_3$ fiber. Lastly, there is a need to identify a Cr getter material that is stable on a metallic support such as stainless steel.

In one or more embodiments, a chromium getter material is disclosed. The chromium getter material, with respect to the disclosed materials, relates to a material structured to, adapted to, capable of preventing chromium contamination and/or poisoning by (a) reacting with the chromium species in a scavenging manner and converting the chromium vapor species into benign non-poisoning material(s), (b) by blocking access of the chromium vapor species to the component being protected against the contamination and/or poisoning due to its inert nature towards the chromium vapor species, or both (a) and (b).

The chromium getter material may be a multi-elemental oxide. The chromium getter may be a ternary oxide. The chromium getter material may be a quaternary oxide. The Cr getter material may have a general formula (I):

$$A_xB_yO_z \quad \text{(I)},$$

where
A is an alkali metal, an alkaline earth metal, or a transition metal, or a combination thereof,
B is carbon, a post-transition metal, or a transition metal, or a combination thereof,
x is a number selected from 1 to 8,
y is a number selected from 1 to 64, and
z is a number selected from 1 to 103.

In the formula (I), A, B may each be an element from the same or different group of II. A, III. A, IV. A, V. A, I. B, II. B, IV. B, VI. B, VII. B, VIII. B, and/or the third, fourth, fifth, or sixth period of the Periodic Table of Elements. A and B may be different elements. A may be an alkaline earth metal such as Mg, Ca, Sr, Ba, or a transition metal such as Cr. B may be a post-transition metal such as Bi, Al, or a transition metal such as Y, Mn, Cr, Co, Cu, Ni, Ti, Zn, or Fe. A may be a combination or mixture of two or more elements named herein. For example, A may be a mixture of Ba and Sr. B may be a combination or mixture of two or more elements named herein. For example, B may be a mixture of Cu, Mn, and Ni.

In one or more embodiments, B may be a nonmetal such as carbon (C). When B is carbon, A may be an alkali metal such as Li, K, an alkali earth metal such as Mg, Ca, Cr, Ba, or a transition metal such as Mn, Fe, Co, Ni, Cu, or Zn.

In the formula (I), x, y, z may each be any number from 1 to 103, including fractions, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 70, 75, 80, 85, 90, 95, 100, 101, 102, or 103. $1 \leq x, y, z \leq 103$. $y \leq x+z$, $x \geq y$, $z \geq x+y$, $y \leq x+z$, $z$, $x \geq y$, $z \geq x$ or $y$, $y \leq x$ or $z$, $y \geq x$. In a non-limiting example, x may be any number from 2 to 8. In a non-limiting example, y may be any number from 3 to 13. In a non-limiting example, z may be any number from 1 to 15, 1 to 30, or 1 to 103. In a non-limiting example, x may be 3, y may be 2, z may be 8. In a non-limiting example, x may be 5, y may be 3, z may be 13. In a non-limiting example, x may be 8, y may be 6, z may be 21.

Non-limiting examples of chromium getter compositions/materials having the formula (I) include $Ba_2TiO_4$, $Ba_3Mn_2O_8$, $Ba_5Cr_3O_{13}$, $Ba_8(Bi_2O_7)_3$, $BaBiO_3$, $Ca_2Fe_2O_5$, $CaBi_2O_4$, $Cr(Bi_7O_{12})_2$, $Mg_3NiO_4$, $Mg_6MnO_8$, $Sr_2FeO_4$, $Sr_2TiO_4$, $Sr_3Al_2O_6$, $Sr_3Ti_2O_7$, $Sr_5(BiO_4)_3$, $Sr_7Mn_4O_{15}$, $SrBiO_3$, $SrFe_2O_4$, $BaNiO_3$, or a combination thereof. Non-limiting examples of chromium getter compositions/materials having the formula (I) include one or more compositions listed in the Tables 2 and 3.

The chromium getter material disclosed herein may have crystal structure revealable by X-ray diffraction (XRD) technique. The different crystal structure may include cubic, tetragonal, trigonal, orthorhombic, hexagonal, triclinic, monoclinic structure, or a combination thereof. In some embodiments, it may be possible to find impurity XRD peaks.

The chromium getter material may be a perovskite material. The material may have a perovskite crystal lattice or a network of corner-sharing $BX_6$ octahedra that crystallize with a general $ABX_3$, or similar, stoichiometry.

The perovskite chromium getter material may have a general formula (II):

$$ABO_3 \qquad (II),$$

where
A is an alkaline earth metal or a transition metal, and
B is a post-transition metal or a transition metal.

In the formula (II), A, B may each be an element from the same or different group of II. A, III. A, IV. A, V. A, I.B, II. B, IV. B, VI. B, VII. B, VIII. B, and/or the third, fourth, fifth, or sixth period of the Periodic Table of Elements. A and B may be different elements. A may be an alkaline earth metal such as Mg, Ca, Sr, Ba, or a transition metal such as Cr. B may be a post-transition metal such as Bi, Al, or a transition metal such as Mn, Ti, Y, Cu, or Fe. A may be a combination or mixture of two or more elements named herein. For example, A may be a mixture of Ba and Sr. B may be a combination or mixture of two or more elements named herein. For example, B may be a mixture of Cu, Mn, and Ni.

Figure 3:
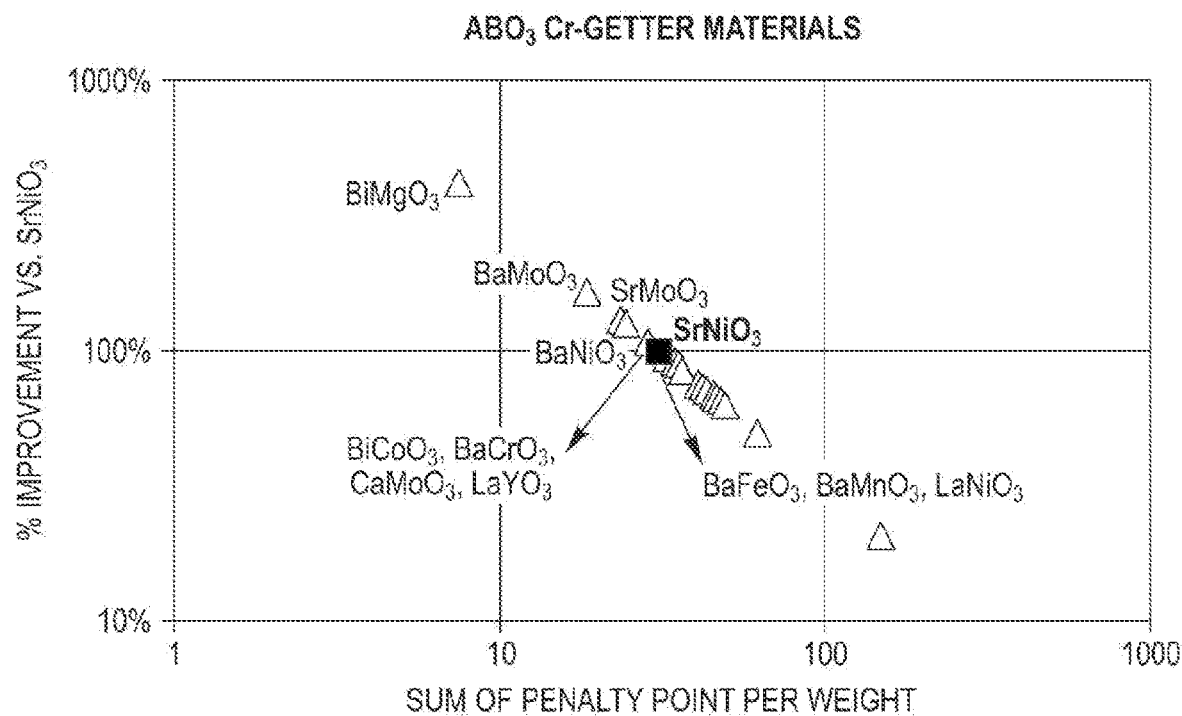
FIG. 3 is a plot of perovskite $ABO_3$ compounds evaluated with $CrO_3$, $CrO_4H_2$, and $CrO_3H_2$ reactions.

Example perovskite chromium getter material compositions are shown in FIG. 3. Example perovskite chromium getter material may include $BiMgO_3$. $BaMoO_3$, $SrMoO_3$ $BaNiO_3$, $BaCoO_3$, $BaCrO_3$, $CaMoO_3$, $LaYO_3$, $BaFeO_3$, $BaMnO_3$, and $LaNiO_3$, or a combination thereof.

The chromium getter material may be a spinel material. The material may have a spinel crystal structure or a structure with cubic close-packed oxides with eight tetrahedral and four octahedral sites per formula unit. The tetrahedral spaces may be smaller than the octahedral spaces. B ions may occupy half the octahedral holes while A ions may occupy one-eighth of the tetrahedral holes.

The chromium getter spinel material may have a general formula (III):

$$A_2BO_4 \qquad (III),$$

where
A is an alkaline earth metal or a transition metal, and
B is a post-transition metal or a transition metal.

In the formula (III), A, B may each be an element from the same or different group of II. A, III. A, IV. A, V. A, I. B, II.B, IV. B, VI. B, VII. B, VIII. B, and/or the third, fourth, fifth, or sixth period of the Periodic Table of Elements. A and B may be different elements. A may be an alkaline earth metal such as Mg, Ca, Sr, Ba, or a transition metal such as Cr. B may be a post-transition metal such as Bi, Al, or a transition metal such as Mn, Ti, Y, Cu, or Fe. A may be a combination or mixture of two or more elements named herein. For example, A may be a mixture of Ba and Sr. B may be a combination or mixture of two or more elements named herein. For example, B may be a mixture of Cu, Mn, and Ni.

Figure 4:
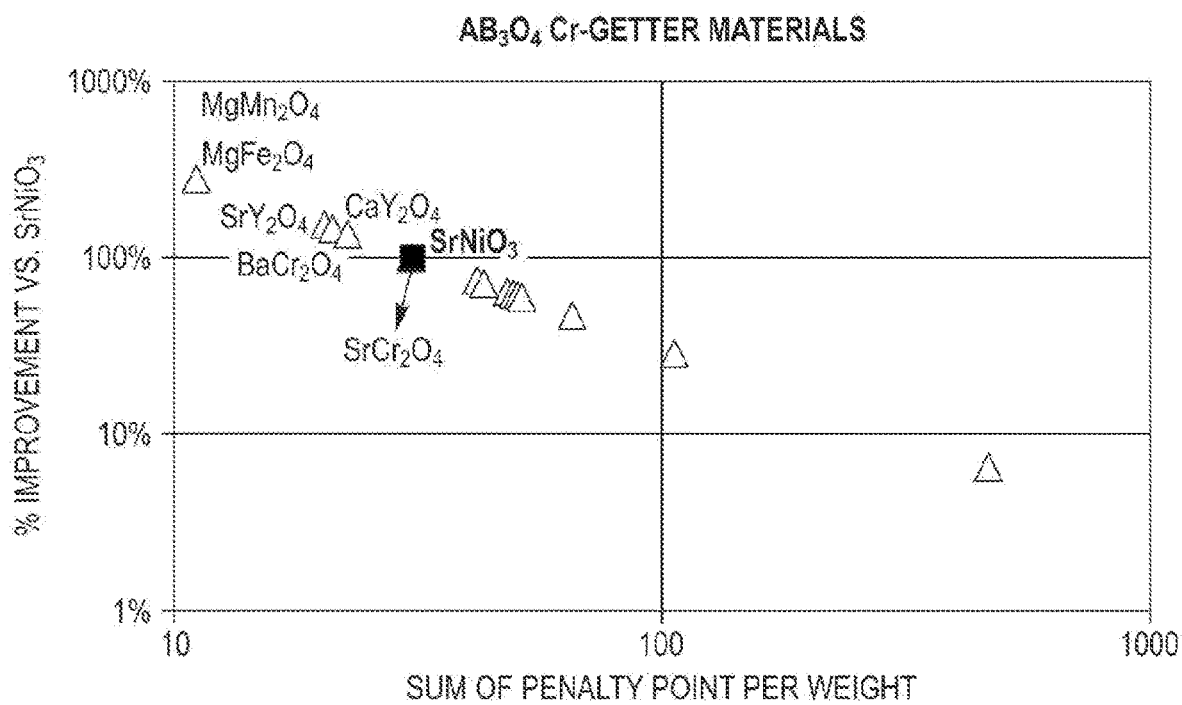
FIG. 4 is a plot of spinel $AB_2O_4$ compounds evaluated with $CrO_3$, $CrO_4H_2$, and $CrO_3H_2$ reactions.

Example spinel chromium getter material compositions are shown in FIG. 4. Example spinel chromium getter material may include $MgMn_2O_4$, $MgFe_2O_4$, $SrY_2O_4$, $BaCr_2O_4$, $CaY_2O_4$, $SrCr_2O_4$, or a combination thereof.

The material may be exclusive of one or more compositions of the formulas (I), (II), and/or (III) such as $SrNiO_3$, $BaTiO_3$, $SrCO_3$, $BaAl_2O_4$, $MgMn_2O_4$, and/or $Na_2CO_3$. In other words, the material may cover compounds of the formulas (I), (II), and/or (III) except one or more compositions named herein such as $SrNiO_3$, $BaTiO_3$, $SrCO_3$, $BaAl_2O_4$, $MgMn_2O_4$, and/or $Na_2CO_3$. Other compositions may be excluded.

The system, the electrochemical cell component, the fuel cell component, the surface portion, the chromium getter material may also include, at least temporarily, a material having a general formula (IV):

$$M_xCr_yO_z \qquad (IV),$$

where
M is an alkaline earth metal, a post-transition metal, or a transition metal, and
x, y, z is each independently any number between 1 and 12.

In the formula (IV), M may each be an element from the group of II. A, III. A, IV, V. A, II.B, IV. B, VI. B, VII. B, VIII.B, and/or the third, fourth, fifth, or sixth period of the Periodic Table of Elements. M may each be an alkaline earth metal such as Mg, Ca, Sr, Ba, a post-transition metal such as Bi, Al, or a transition metal such as Y, Mn, Cr, Co, Ni, Ti, Zn, or Fe. M may be Ca, Mg, Ni, Y, or Bi.

In the formula (I), x, y, z may each be any number from 1 to 12, including fractions, such as 1, 2, 3, 4, 5, 6, 7, 8, 9, 10, 11, or 12. $1 \leq x, y, z \leq 12$.

The material of formula (IV) is a product of a reaction between the material of formula(s) (I), (II), and/or (III) with one or more species of the chromium vapors described herein.

The material of formulas (I), (II), and/or (III) may be Cr vapor getter material or a material preventing reactions of Cr vapors with the bulk material and/or non-Cr-getter surface portion material of the electrochemical cell component. The chromium vapors may include Cr—O—(H) species, including, but not limited to, CrO, $CrO_3$, $CrO_3H_2$, $CrO_4H_2$, and/or $CrO_3O_2$.

The material may be non-reactive against the one or more chromium species. The material may be chemically inactive or inert towards the chromium vapor species. The material may thus be a physical barrier material. A non-limiting example of a physical barrier material may be $CaCrO_4$, $MgCr_2O_4$, $NiCrO_4$, $Y_2Cr_3O_{12}$, and $Cr_2(Bi_2O_5)_3$.

The material may be reactive against one or more chromium species. The material may thus be a Cr scavenger material. Non-limiting example of scavenger material may be $Ba_8(Bi_2O_7)_3$, $Mg_6MnO_8$, $Cr(Bi_7O_{12})_2$, $Ba_7Al_{64}O_{103}$, $Sr_5(BiO_4)_3$, and additional materials named in the tables below.

The material may be a physical barrier material against one or more Cr vapors and a scavenger against one or more Cr vapors. For example, a material of formula (I), (II), or (III) may be a scavenger against CrOand a physical barrier against $CrO_3$, $CrO_4H_2$, and $CrO_3O_2$.

The system may include a material including one or more compositions of the formulas (I), (II), or (III), or their combination. In at least one embodiment, the system may include at least one composition of the material of formulas (I)-(IV) structured as a scavenger in combination with at least one composition of the material of formula (IV) structured as a physical barrier layer. In such embodiment, the physical barrier layer may be located between the scavenger and the component's bulk portion. Alternatively, the scavenger may be located between the physical barrier and the component's bulk portion. The combination may include a chemical mixture, a physical mixture of the oxides, or both.

The material of formulas (I), (II), and/or (III) may be further modified to include an oxygen vacancy, cation doping or substitution on the transition metal site (Ca, Mg, Ni, Y, or Bi site), or anion doping or substitution on the oxygen site (F, N, C, Cl, Br, I, S, P doping on oxygen site). For example, the material of formulas (I), (II), and/or (III) may form an oxygen vacancy in the elevated operating temperatures of the electrochemical cell.

The chromium getter material may include only one of the materials of formulas (I), (II), (III), or (IV). In another embodiment, the chromium getter material may include the material of a combination of the formulas (I), (II), (III), and/or (IV). The chromium getter material may include more than about 25-75, 30-70, or 35-65% of the material of formula (I) and/or less than about 50, 40, 35, 30, 25, 20, 15, or 10% of the material of formula (IV).

The chromium getter material may be included in an electrochemical cell component of an electrochemical cell system. The electrochemical cell system may include a chromium-rich or chromium-containing surface. The electrochemical cell system may include chromium-rich steel in one or more surfaces within the system. The chromium-rich surface may, as a result of opening temperatures, and/or other factors, release one or more chromium vapor species described herein.

The component may be a component which is susceptible to chromium poisoning and/or contamination, and which may have lower performance, durability, or both as a result of encounter and/or reaction with chromium vapors. Chromium poisoning relates to unwanted reactions between the component and chromium vapors resulting in negative effects on the component and its intended performance. The component may be a cathode. The component may be an inline getter within the system structured to filter the gas stream. The component may be located adjacent to, directly adjacent to, in the vicinity of, or in an enclosed system with a chromium-rich surface, material, component, as described above.

Figure 5:
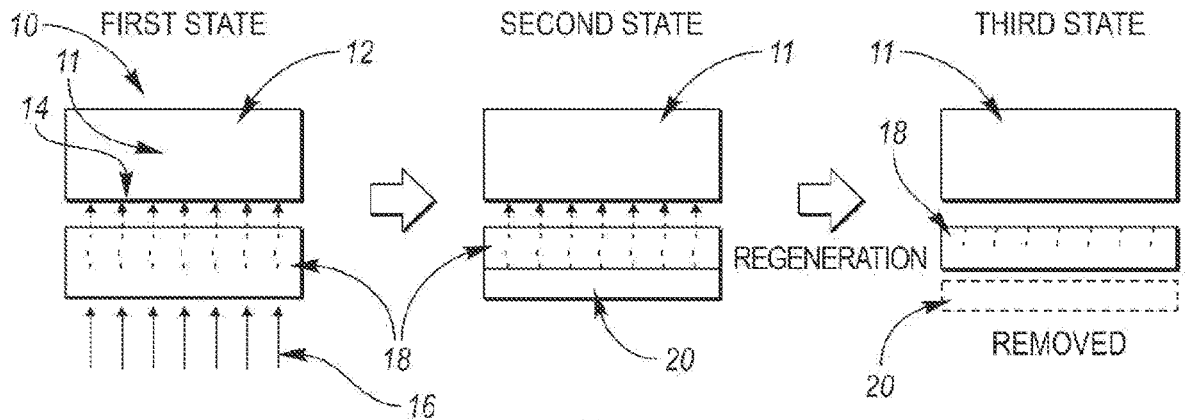
FIG. 5 is a schematic depiction of the system disclosed herein including a chromium vapor species scavenger.

The electrochemical cell component may include a bulk portion and a surface portion. A non-limiting schematic example of an electrochemical cell system having an electrochemical cell component, which needs protection from chromium vapor poisoning, is shown in FIG. 5. As can be seen in FIG. 5, the electrochemical cell system 10 includes an electrochemical cell component 11 having a bulk portion 12 and a surface portion 14.

The chromium getter material may be included in a surface portion 14 of the component 11. The entire area of the surface portion 14 may include the chromium getter material. Alternatively, the surface portion 14 may include one or more sub-portions which are free from the chromium getter material. In an example embodiment, the entire surface portion 14 may include the chromium getter material such that the entire component 11 is protected against Cr vapors. In other embodiments, only a small portion of the surface portion 14 may include the chromium getter material such as less than about ½, ¼, ⅛, 1/16, 1/32, or the like of the surface portion 14 may include the chromium getter material.

The surface portion 14 may include one or more layers of the disclosed chromium getter material. In other words, the Cr getter material may form one or more layers on the surface portion 14 of the component 11. The one or more layers may be a coating on the bulk portion. The chromium getter material thickness on the surface portion 14 may be adjusted according to the needs of a specific application. A non-limiting example of the material layer thickness may be about 0.5 to 5 µm, 0.8 to 4.5 µm, or 1 to 4 µm. The material may be layered to form a relatively thick deposit with dimensions of about, at least about, no more than about, or more than about 0.5-5.0 µm on the surface portion such as about or at least about 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, 5.0 µm.

The material may form particles. The particles may be micro or nanoparticles. The particles may have a size of about, at least about, or at most about 0.05 to 2 µm, 0.07 to 1.5 µm, or 0.1 to 1 µm. The particles may have a size of about, at least about, or at most about 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.00, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, or 2.00 µm.

The material may form one or more layers or a plurality of layers on the bulk portion. The material may form 1, 2, 3, 4, 5, 6, 7, 8, 9, 10, or more layers on the bulk portion. Each layer, or their totality, may have a thickness within the nanoscale or microscale recited herein with respect to the thickness of the surface portion. The material may form at least about or about 5, 7.5, 10, 12.5, 15, 17.5, 20, 22.5, or 25% of the total surface portion and/or coating by molar fraction.

The bulk 12 material of the surface portion is metal, ceramic, or both. The metal may be a steel such a Cr-rich steel. The metal/steel may include $Al_2O_3$, $Fe_2O_3$, and/or $Cr_2O_3$. The chromium getter material disclosed herein may be applied onto the metal/steel/$Al_2O_3$, $Fe_2O_3$, and/or $Cr_2O_3$.

The electrochemical cell system 10 and/or component 11 having, including, comprising, consisting essentially of, or consisting of, the Cr getter material(s) may have two and/or three different states. The different states are schematically shown in FIGS. 5 and 6.

Looking at FIG. 5, in the first state, the system 10 and/or component 11 may include a surface portion 14 of the component 10 including the material of formula (I), (II), (III), or their combination. In the first state, the electrochemical cell system 10 also includes chromium vapors 16 described above. In the first state, the electrochemical cell system 10 and/or component 11 may include the chromium scavenger 18.

In the second state, the system 10 may include one or more compounds 20 having a formula (IV). In the second state, the system 10 may include one or more compounds 20 having a formula (IV) as a result of a reaction of the scavenger 18 and the chromium vapors 16 forming a new material 20 having the formula (IV). The new material may be benign, in other words, not affecting the component negatively.

Figure 6:
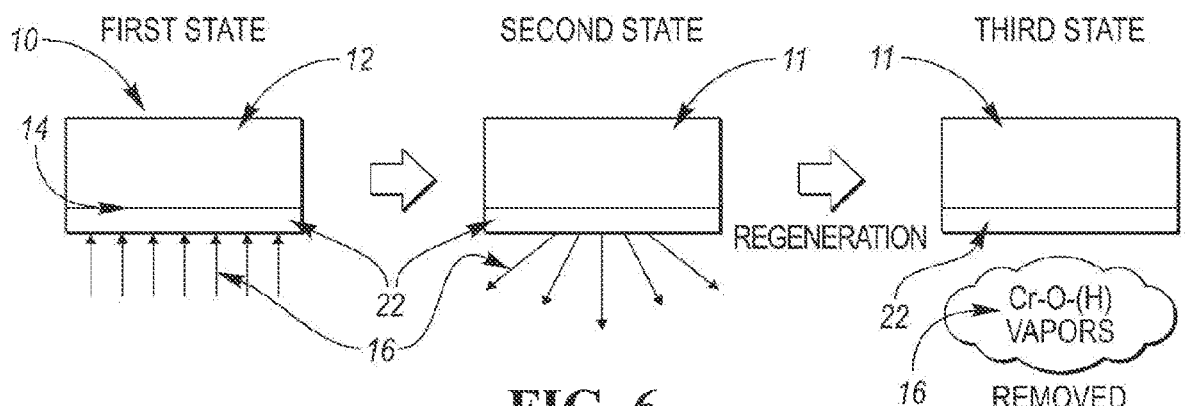
FIG. 6 is a schematic depiction of the system disclosed herein including a physical barrier material.

Depicted in FIG. 6, the system 10 may include a physical barrier 22 species. The physical barrier 22 species are shown schematically in FIG. 6. In the first state and/or the second state, the physical barrier 22 material prevents a reaction of the component 10, the bulk material 12, the surface portion 14, or a combination thereof with the chromium vapors 16 due to presence of the chromium getter material which physically prevents contact of the component 10, the bulk material 12, and/or the surface portion 14 with the chromium vapors 16. The physical barrier 22 material is non-reactive towards one or more of the chromium vapor species 16 present in the system 10. The physical barrier 22 material may have a formula (I), (II), (III), (IV), or their combination.

The third state may be called the regeneration state. During the regeneration state, the system 10 is being brought into the first state, but without the presence of chromium vapors. In the third state, one or more gas agents structured to remove the chromium vapors and/or the product(s) of formula (IV) may be introduced into the system 10. The one or more gas agents may remove the product(s) having formula (IV) from the system 10. Alternatively, or in addition, the material 20 of formula (IV) may be physically removed from the system 10 by mechanical wiping, scraping, rubbing, cleaning, etc. The one or more gas agent(s) may remove the chromium vapors. The removal may be initiated when the concertation of the Cr vapors reaches a predetermined value.

The system 10 may include both scavenger(s) 18 and the physical barrier(s) 22 which may complement one another and work together to minimize the amount of Cr poisoning, contamination, presence of Cr vapors in the system 10.

The Cr getter materials of formulas (I), (II), and/or (III) disclosed herein may be prepared, for example, by metal oxide synthesis by the following method. The method may include annealing metal containing precursors with desired stoichiometric amount in oxidizing (air or $O_2$) or reducing heat treatment condition using $N_2$, Ar, or $H_2$ mixture gas. The heat treatment temperature may range from about 150 to 1500, 200 to 1200, or 300 to 900° C. to yield desired oxide(s) and/or doped composition(s). The heat treatment time may vary from about 30 seconds to 48 hours, 5 minutes to 24 hours, or 1 hour to 12 hours.

The metal precursors may be prepared, for example, by solid-state synthesis route (e.g., ball milling process), co-precipitation process (e.g., solution-based process), sol-gel process, hydrothermal process, etc.

The oxide may be deposited on to designated support materials (either ceramic or metallic substrate) during the synthesis process, or as a post-treatment step. Deposition technique may include, but not be limited to, physical vapor deposition, chemical vapor deposition, atomic layer deposition, solution-based approach, etc.

The chromium getter material including one or more oxides disclosed herein may be added to a washcoat slurry to obtain the desired active surface portion. The slurry may include alumina, ceria, carbon, and/or other compounds. The slurry may be structured as a support for the active oxides.

While the discussion herein focuses on the electrochemical cell system, the materials, methods, and strategies described herein may be applicable to any system containing oxidizable chromium-containing metal including system with Cr-rich steel. Example systems include electrochemical cells, chemical cells, fuel cells, electrolyzers, fuel cells with fuel flexibility, fuel cells with a liquid electrolyte, fuel cells with a solid electrolyte, fuel cells with a ceramic electrolyte, their stacks as well as their individual components.

A method of utilizing the herein-disclosed material is disclosed. The method may include providing an electrochemical cell system including an electrochemical cell component. The method may include protecting the electrochemical cell component from one or more Cr vapor species by including a chromium getter material having a formula (I), (II), (III), and/or (IV) as part of the electrochemical cell system. The chromium getter material may be a scavenger, a physical barrier, or both. The method may include reacting the chromium getter material with the one or more Cr vapor species and forming a new Cr—M—O material. The method may include regenerating the system by introducing one or more gas agents structured to remove the new Cr—M—O species from the system. The method may include removing the new Cr—M—O species physically by mechanically removing the new Cr—M—O species from the component and/or the system.

The method may include protecting the electrochemical cell component by forming a physical barrier layer on the electrochemical cell surface portion. The method may include removing the accumulated Cr vapor species when the concentration of the Cr vapor species reaches a predetermined level. The method may include introducing one or more gas agents structured to remove the Cr vapor species into the system.

Experimental Section

At the onset, a database driven materials screening was conducted to identify possible Cr getter candidates in the perovskite and spinel compound groups. The criteria was chosen as compounds with thermodynamic stability up to 600° C. The candidate material was reacted against Cr vapor compounds including $CrO_3$, $CrO_2(OH)_2$, and $CrO(OH)_2$ to determine the most thermodynamically-stable reaction pathway (i.e., at its minimum reaction enthalpy in 2D phase space between oxide and Cr vapor species). $SrNiO_3$ was chosen as a reference material.

Figure 2:
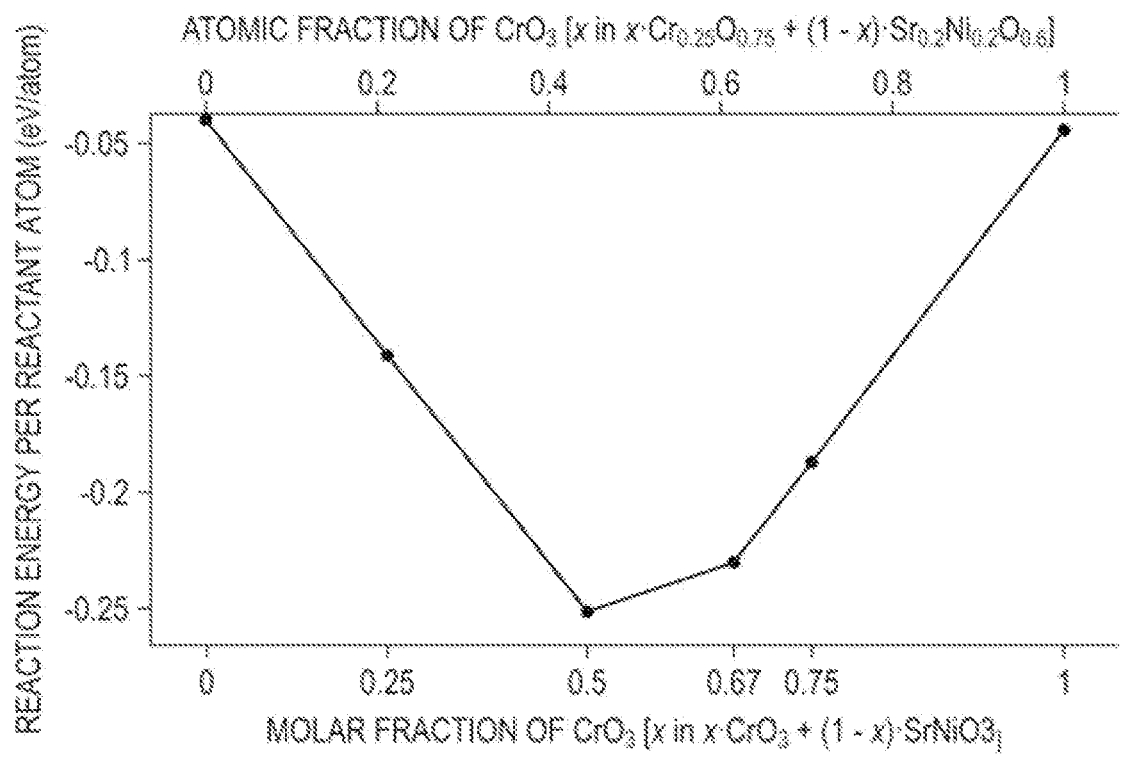
FIG. 2 is a phase diagram between $CrO_3$ and $SrNiO_3$.

FIG. 2 shows an example phase diagram generated between $CrO_3$ and $SrNiO_3$. In FIG. 2, the molar fraction (x) indicates amount of $CrO_3$ and $SrNiO_3$. For example, when x=0, it would be pure $SrNiO_3$; and, when x=1, it would be 100% $CrO_3$. The most stable decomposition reaction takes place at x=0.5 (i.e., at its minimum $E_{rxn}$). The most stable decomposition reaction between $CrO_3$ and $SrNiO_3$ occurs at molar fraction x=0.5, where $0.5CrO_3$ and $0.5SrNiO_3$ react to form $0.167Ni_3O_4$, $0.167O_2$, and $0.5SrCrO_4$ as decomposition products. As can be seen in FIG. 2, the minimum reaction enthalpy ($E_{Rxn}$) between $CrO_3$ and $SrNiO_3$ is −0.251 eV/atom.

It is desired that a Cr getter material may be scavenged after reacting with Cr vapor species. For example, if both $SrNiO_3$ and $LaNiO_3$ react with $CrO_3$, but more $CrO_3$ is being consumed by $LaNiO_3$, $LaNiO_3$ would scavenge $CrO_3$ better than be $SrNiO_3$ per mole. The corresponding reaction enthalpy ($E_{rxn}$) describes how favorable a certain reaction is. Thus, reactions with lower values of $E_{rxn}$ indicate occurrence of more favorable Cr vapor scavenging reactions. For instance, when $E_{rxn}$ is −0.6 eV/atom, the corresponding decomposition reaction will be more favorable compared to the case when $E_{rxn}$ is found to be −0.4 eV/atom, which is desirable.

(I) Cr/Oxide Molar Ratio and Reaction Enthalpy Against $CrO_3$, $CrO_4H_2$, and $CrO_4H_2$ The evaluation of the candidate species included six criteria: (1) Cr/oxide molar ratio against $CrO_3$, (2) Cr/oxide molar ratio against $CrO_4H_2$, (3) Cr/oxide molar ratio against $CrO_4H_2$, (4) reaction enthalpy against $CrO_3$, (5) reaction enthalpy against $CrO_4H_2$, and (6) reaction enthalpy against $CrO_3H_2$.

Table 1 below shows chemical reactivity of $SrNiO_3$ at its most stable thermodynamic reaction between oxide and Cr vapor species, where $E_{rxn}$ is at minimum (i.e., most stable reaction). From each reaction, Cr vapor to oxide ratio was determined. For example, when 0.5 $CrO_3$ reacts with $0.5SrNiO_3$, Cr vapor to oxide ratio (denoted as Cr/oxide) is 1. The minimum reaction enthalpy ($E_{rxn}$) is also provided, which is the y-value for a given reaction.

TABLE 1

Chemical reactivity of $SrNiO_3$ against $CrO_3$, $CrO_4H_2$, and $CrO_3H_2$ vapor species

| Cr-getter material | Species | Most stable reaction equation | Cr/ Oxide | $E_{rxn, min.}$ [eV/ atom] |
|---|---|---|---|---|
| $SrNiO_3$ | $CrO_3$ | $0.5\ CrO_3 + 0.5\ SrNiO_3 \rightarrow$ $0.167\ Ni_3O_4 + 0.5$ $SrCrO_4 + 0.167\ O_2$ | 1 | −0.251 |
| | $CrO_4H_2$ | $0.4\ Cr(HO_2)_2 + 0.6\ SrNiO_3 \rightarrow$ $0.2\ Sr(H_2O_3)_2 + 0.4$ $SrCrO_4 + 0.6\ NiO$ | 0.67 | −0.178 |
| | $CrO_3H_2$ | $0.5\ CrH_2O_3 + 0.5\ SrNiO_3 \rightarrow$ $0.5\ SrCrO_4 + 0.5$ $NiO + 0.5\ H_2O$ | 1 | −0.197 |

A penalty point system was introduced. A penalty point (PP) of 1 for $SrNiO_3$ was assigned in each studied criterion. Depending on Cr/oxide and reaction enthalpy for each candidate, its penalty point (PP) was evaluated, referenced to $SrNiO_3$. For practical purposes, accommodation per weight of coating was made. All criteria were evaluated per weight of oxide materials, using their molecular weight.

When a candidate phase has higher Cr/oxide after the reaction when compared to $SrNiO_3$, the corresponding penalty point is less than 1, representing a more favorable material. If the reaction enthalpy of oxide phase is more negative than $SrNiO_3$, then the corresponding penalty point is less than 1, representing a more favorable material. A candidate material with the least amount of PPs (i.e., sum of penalty points) was sought.

Evaluating all six criteria, sum of penalty points for $SrNiO_3$ is 6. The molecular weight of $SrNiO_3$ is 194.31 g/mol, and PP sum per weight (mg) is found to be then 6/194.31×1000=30.878.

Perovskite

The materials databases were screened to identify candidate materials having thermodynamic stability up to 600° C. Functionality tests were performed for the identified 28 perovskite $ABO_3$ compounds by simulating a chemical reaction against $CrO_3$, $CrO_4H_2$, and $CrO_3H_2$. The compounds included $BaCoO_3$, $BaCrO_3$, $BaFeO_3$, $BaMnO_3$, $BaMoO_3$, $BaNiO_3$, $BiCrO_3$, $BiMgO_3$, $BiMnO_3$, $CaCoO_3$, $CaCrO_3$, $CaFeO_3$, $CaMoO_3$, $CeCoO_3$, $CeCrO_3$, $CeFeO_3$, $CeMnO_3$, $CeNiO_3$, $LaCoO_3$, $LaCrO_3$, $LaFeO_3$, $LaMnO_3$, $LaNiO_3$, $LaYO_3$, $SrCoO_3$, $SrCrO_3$, $SrFeO_3$, and $SrMoO_3$.

FIG. 3 shows the perovskite candidate evaluation with $CrO_3$, $CrO_4H_2$, and $CrO_3H_2$ reactions for the $ABO_3$ compounds. The x-axis shows the sum of penalty points per weight of $ABO_3$ compounds by adding the six different evaluation criteria described above. For $SrNiO_3$, this value is 30.878. The y-axis shows % improvement vs. $SrNiO_3$, where this value for $SrNiO_3$ is 100%. For example, $BiMgO_3$ shows 414.2% improvement vs. $SrNiO_3$: 30.878/ 7.455=414.2%.

The top candidate that may scavenge all Cr vapor species when compared to $SrNiO_3$ (i.e., 414.2% improvement) is $BiMgO_3$. $BaMoO_3$, $SrMoO_3$, and $BaNiO_3$ also show improvement in Cr vapor scavenging reactions (vs. $SrNiO_3$), with 166.9%, 130.5%, and 125.4% improvement, respectively. Other $ABO_3$ compounds such as $BaCoO_3$, $BaCrO_3$, $CaMoO_3$, $LaYO_3$, $BaFeO_3$, $BaMnO_3$, and $LaNiO_3$ show comparable Cr vapor reactions when compared to $SrNiO_3$, ranging from 90.4 to 108.7% improvement.

Spinel

The materials databases were screened to identify candidate materials having thermodynamic stability up to 600° C. Functionality tests were performed for the identified 18 spinel $AB_2O_4$ compounds by simulating a chemical reaction against $CrO_3$, $CrO_4H_2$, and $CrO_3H_2$. The compounds included $BaCr_2O_4$, $CaCr_2O_4$, $CaY_2O_4$, $Co_3O_4$, $CoCr_2O_4$, $CoFe_2O_4$, $CoMn_2O_4$, $FeCr_2O_4$, $FeMn_2O_4$, $MgCr_2O_4$, $MgFe_2O_4$, $MgMn_2O_4$, $MnCr_2O_4$, $MnFe_2O_4$, $Mn_3O_4$, $NiCr_2O_4$, $SrCr_2O_4$, and $SrY_2O_4$.

FIG. 4 shows the screening results for the $AB_2O_4$ compounds. The x-axis shows the sum of penalty points per weight of $AB_2O_4$ compounds by adding the six different evaluation criteria described above. For $SrNiO_3$, this value is 30.878. The y-axis shows % improvement vs. $SrNiO_3$, where this value for $SrNiO_3$ is 100%. For example, $MgMn_2O_4$ shows 279.0% improvement vs. $SrNiO_3$: 30.878/ 11.068=279.0%. Enhanced Cr-getter materials and other oxide materials that show comparable performance to $SrNiO_3$ are marked in FIG. 4.

$MgMn_2O_4$ and $MgFe_2O_4$ were the top candidates that scavenged all Cr vapor species very well when compared to $SrNiO_3$ (i.e., 279.0 and 275.8% improvement, respectively). $SrY_2O_4$, $BaCr_2O_4$, and $CaY_2O_4$ also showed improvement in Cr vapor scavenging reactions (vs. $SrNiO_3$), with 152.3, 146.3, and 136.2% improvement, respectively. $SrCr_2O_4$ was found to have comparable Cr vapor reactions with $SrNiO_3$ (100.9% improvement).

Additional Oxide Compounds

The materials databases were screened to identify additional oxide candidate materials having Mg, Ca, Sr, and/or Ba as well as Fe, Al, Mn, Zn, Ti, Cr, Ni, Mo, or Bi. The tested materials included the following compounds:

$Ba_{11}(Bi_3O_{10})_3$, $Ba_2Bi_2O_5$, $Ba_2CrO_4$, $Ba_2MnO_3$, $Ba_2Ti_{13}O_{22}$, $Ba_2Ti_6O_{13}$, $Ba_2TiO_4$, $Ba_2ZnO_3$, $Ba_3CoO_5$, $Ba_3Cr_2O_9$, $Ba_3Mn_2O_8$, $Ba_3Ti_{20}O_{40}$, $Ba_4Al_2O_7$, $Ba_4Bi_2O$, $Ba_4Ti_{13}O_{30}$, $Ba_5Cr_3O_{13}$, $Ba_7Al_{64}O_{103}$, $Ba_8(Bi_2O_7)_3$, $Ba_8Mn_8O_{21}$, $BaAl_2O_4$, $BaBiO_3$, $BaCr_2O_7$, $BaCrO_4$, $BaMn_6O_{12}$, $BaMn_8O_{16}$, $BaMoO_4$, $BaTi_2O_5$, $BaTi_8O_{16}$, $BaTiO_3$, $BaZnO_2$, $Ca_{11}Al_{14}O_{32}$, $Ca_2Fe_2O_5$, $Ca_2Mn_3O_8$, $Ca_2Ti_3O_8$, $Ca_3Fe_2O_7$, $Ca_4Bi_2O_4$, $Ca_6Al_7O_{16}$, $CaAl_4O_7$, $CaBi_2O_4$, $CaBi_2O_5$, $CaBi_4O_9$, $CaBiO_3$, $CaMn_2O_4$, $CaMo_2O_4$, $CaMoO_4$, $CaNi_2O_4$, $CaTiO_3$, $Mg_2Mn_3O_8$, $Mg_2TiO_4$, $Mg_3NiO_4$, $Mg_3Ti_9O_{20}$, $Mg_6MnO_8$, $MgAl_2O_4$, $MgBi_2O_6$, $MgMnO_3$, $MgMo_2O_4$, $MgMo_2O_7$, $MgMoO_4$, $MgTi_2O_5$, $MgTi_5O_{10}$, $MgTiO_3$, $r(FeO_2)_2$, $Sr_{16}Mn_8O_{29}$, $Sr_2Bi_2O_5$, $Sr_2CrO_4$, $Sr_2Fe_2O_5$, $Sr_2FeO_3$, $Sr_2FeO_4$, $Sr_2Mn_2O_5$, $Sr_2Ti_6O_{13}$, $Sr_2TiO_4$, $Sr_3(FeO_3)_2$, $Sr_3Al_2O_6$, $Sr_3Fe_2O_7$, $Sr_3Ti_2O_7$, $Sr_4Bi_2O$, $Sr_5(BiO_4)_3$, $Sr_5Mn_5O_{13}$, $Sr_7Mn_4O_{15}$, $Sr_8Fe_8O_{23}$, $SrAl_2O_4$, $SrAl_4O_7$, $SrBi_2O_4$, $SrBiO_3$, $SrCr_2O_7$, $SrCrO_4$, $SrFe_2O_4$, $SrFeO_2$, $SrFeO_3$, $SrMnO_3$, $SrMoO_3$, $SrMoO_4$, $Sr_9(NiO_3)_7$, $Sr_4(NiO_3)_3$, $Sr(NiO_2)_4$, $Sr_{18}Ni_{13}O_{42}$, $Sr_{24}Ni_{19}O_{54}$, $SrTi_{11}O_{20}$, $SrTiO_3$, and $SrZnO_2$.

The materials databases were screened to identify candidate materials having thermodynamic stability up to 600° C. 80 of the 99 tested compounds were identified as better Cr scavenger than the control $SrNiO_3$.

Metal Carbonates

The materials databases were screened to identify metal carbonate materials. $Na_2CO_3$ coating can react with Cr contacting species to form Na-chromate species. The resulting products were found to be soluble in water, which would enable non-complicated cleaning or physical removal if incorporated as Cr getter materials in an electrochemical cell stack. The list of stable reactions for $Na_2CO_3$ with Cr vapor species are listed as the following:

1) 0.667 $CrO_3$+0.333 $Na_2CO_3$→0.333 $Na_2Cr_2O_7$+0.333 $CO_2$ ($E_{rxn}$=−0.083 eV/atom)
2) 0.667 $Na_2CO_3$+0.333 $Cr(HO_2)_2$→0.667 $NaHCO_3$+ 0.333 $Na_2CrO_4$ ($E_{rxn}$=−0.060 eV/atom)
3) 0.4 $Na_2CO_3$+0.6 $CrH_2O_3$→0.4 $NaHCO_3$+0.2 $H_2O$+0.4 $CrHO_2$+0.2 $Na_2CrO_4$ ($E_{rxn}$=−0.033 eV/atom)

With respect to performance of $Na_2CO_3$ and $SrNiO_3$, the carbonate is only 22.6% comparable. This means that $Na_2CO_3$ scavenges Cr vapors less effectively, when compared to $SrNiO_3$. Yet metal carbonates have their advantages in terms of materials cost and maintenance (i.e., its product may be soluble in water to be cleaned afterwards). The decomposition temperature for $Na_2CO_3$ is found to be about 550° C. Additional metal carbonates may include $Li_2CO_3$, $K_2CO_3$, $MgCO_3$, $CaCO_3$, $SrCO_3$, $BaCO_3$, $MnCO_3$, $FeCO_3$, $CoCO_3$, $NiCO_3$, $CuCO_3$, and $ZnCO_3$. Among the list, decomposition temperatures for $MgCO_3$, $MnCO_3$, $CoCO_3$, $NiCO_3$, $CuCO_3$, and $ZnCO_3$ are lower than 400° C.

$Li_2CO_3$, $K_2CO_3$, $CaCO_3$, $SrCO_3$, $BaCO_3$, and $FeCO_3$ are more stable at elevated temperatures, relevant to electrochemical cell operation. $K_2CO_3$, $SrCO_3$, and $FeCO_3$ were found to have similar performance as $Na_2CO_3$ in terms of Cr scavenging reactions (about 20% in comparison to $SrNiO_3$). The carbonates may lead to formation of $CO_2$ and $H_2O$, which may impact the electrochemical cell performance and degradation.

(II) Products of the Cr Vapor Reactions with $ABO_3$ and $AB_2O_4$

The perovskite and the spinel candidate compounds were evaluated with respect to the resulting M—Cr—O species that are products of $ABO_3$ or $AB_2O_4$ in contact with Cr vapor species.

(a) The candidate compounds may be reactive with at least some Cr vapors (Cr—O—(H) species) to form a M—Cr—O species. Such compounds may be Cr scavengers, capturing and/or consuming Cr vapors, and forming a new M—Cr—O species. The mechanism of the Cr scavenger in an electrochemical cell is depicted in FIG. 5, as was explained above.

Regarding the control, $SrNiO_3$ forms $SrCrO_4$ species after reacting with Cr vapors. $SrCoO_4$ further reacts with $CrO_3$: 0.5$CrO_3$+0.5$SrCrO_4$→0.5$SrCr_2O_7$ with $E_{rxn}$ value of −0.020 eV/atom. In addition, $SrCrO_4$ can react with $CrO_4H_2$: 0.5Cr$(HO_2)_2$+0.5$SrCrO_4$→0.5$SrCr_2O_7$+0.5$H_2O$ with $E_{rxn}$ value of −0.002 eV/atom. But $SrCrO_4$ does not react with $CrO_3H_2$. This means that once SrO in $SrNiO_x$ scavenges Cr vapors and converts to $SrCrO_4$, the resulting product can also further react with additional Cr vapors to form $SrCr_2O_7$ (although reaction enthalpy is quite small). $SrCr_2O_7$ will not react with CrO and $CrO_4H_2$, but will react with $CrO_3H_2$, forming some $SrCrO_4$ back: 0.6$CrH_2O_3$+ 0.4$SrCr_2O_7$→0.2$Cr_5O_{12}$+0.4$SrCrO_4$+0.6$H_2O$ with $E_{rxn}$ value of −0.006 eV/atom.

The analysis was repeated for both perovskite and spinel candidate species, specifically for the M—Cr—O species that are products of $ABO_3$ or $AB_2O_4$ in contact with Cr vapor species.

(b) The candidate compounds may be non-reactive with the Cr vapors (at least $CrO_3$, $CrO_4H_2$, and $CrO_3O_2$). Such compounds may be "physical barrier" species, where M—Cr—O—(H) species are not able to poison the surface of these oxide materials. The physical barrier species may be included as the outer-most layer(s) or at the surface of the electrochemical cell component(s), structured to physically prevent contact between the Cr vapors and the electrochemical cell components.

Since in the system with a physical barrier species the Cr vapors remain, react, and accumulate, the Cr vapors may be removed physically and/or by using oxidizing or reducing agents during a regeneration or cleaning cycle. The mechanism of the Cr physical barrier species in an electrochemical cell is depicted in FIG. 6, as was explained above.

Among the candidates, $CaCrO_4$, $MgCr_2O_4$, $NiCrO_4$, $Y_2Cr_3O_{12}$, and $Cr_2(Bi_2O_5)_3$ do not react at all against $CrO_3$, $CrO_4H_2$, and $CrO_3O_2$. The identified group of the five species may be included in the electrochemical cell system as "physical barrier" species, where M—Cr—O—(H) species are not able to poison the surface of these oxide materials.

(III) Finite Temperature Stability Testing

Figure 7:
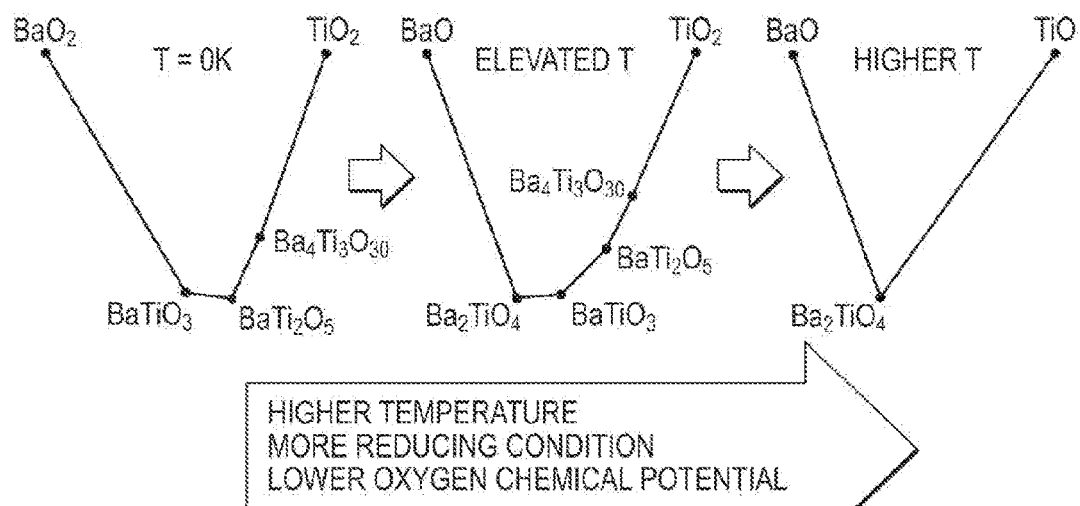
FIG. 7 is Ba—Ti—O chemical space at T=0K (left panel) vs. finite temperature (middle and right panels).

Since thermal stability of the candidate compounds is of importance due to the electrochemical cell operating temperature or about 400-1200° C., chemical space of the candidate species was examined at different temperatures. For example, Ba—Ti—O space in FIG. 7 was observed. As can be seen in FIG. 7, at T=0K, it is possible to observe $BaO_2$, $BaTiO_3$, $BaTi_{2O5}$, $Ba_4Ti_{13}O_{30}$, and $TiO_2$ to be stable species in the left panel of FIG. 7. But at room temperature, barium oxide exists in the form of $Ba_{2+}$, i.e., BaO. As the temperature is increased by reducing the oxygen chemical potential values, BaO becomes stable in the middle panel in FIG. 7, along with $Ba_2TiO_4$, $BaTiO_3$, $BaTi_2O_5$, and $Ba_4Ti_{13}O_{30}$. In extremely high T condition as shown in the right panel of FIG. 7, many species disappear and only BaO, $Ba_2TiO_4$, and TiO (i.e., reduced titanium oxide) are three stable species.

The analysis was conducted for the promising perovskite, spinel, additional oxide candidates, as well as the physical barrier species. Table 2 summarizes results of the analysis. The 34 compounds listed in Table 2 have better performance in scavenging or physically blocking Cr vapors. The compounds listed in Table 2 are stable at elevated temperatures of about 500 to 600° C.

TABLE 2

Thermally stable candidate compounds with improved scavenging performance in comparison to SrNiO$_3$

| Compounds | % improvement vs. SrNiO$_3$ | Crystal Structure | Scavenger (S)/Physical Barrier (PB) |
|---|---|---|---|
| Ba$_8$(Bi$_2$O$_7$)$_3$ | 1886.1% | — | S |
| Mg$_6$MnO$_8$ | 1124.1% | — | S |
| Cr(Bi$_7$O$_{12}$)$_2$ | 910.4% | — | S |
| Ba$_7$Al$_{64}$O$_{103}$ | 850.7% | — | S |
| Sr$_5$(BiO$_4$)$_3$ | 754.0% | — | S |
| Sr$_7$Mn$_4$O$_{15}$ | 633.9% | — | S |
| Ba$_3$Cr$_3$O$_{13}$ | 609.8% | — | S |
| Ba$_3$CoO$_5$ | 603.9% | — | S |
| Ba$_4$Al$_2$O$_7$ | 588.0% | — | S |
| Mg$_3$NiO$_4$ | 535.1% | — | S |
| Ba$_4$Ti$_{13}$O$_{30}$ | 452.5% | — | S |
| Ba$_2$ZnO$_3$ | 300.7% | — | S |
| MgMn$_2$O$_4$ | 279.0% | AB$_2$O$_4$ | S |
| Sr$_3$Al$_2$O$_6$ | 251.7% | — | S |
| Ba$_2$TiO$_4$ | 225.7% | AB$_2$O$_4$ | S |
| Sr$_3$Ti$_2$O$_7$ | 224.9% | — | S |
| CaBi$_2$O$_4$ | 222.5% | AB$_2$O$_4$ | S |
| BaBiO$_3$ | 177.4% | ABO$_3$ | S |
| Ba$_3$Mn$_2$O$_8$ | 177.4% | — | S |
| Sr$_2$FeO$_4$ | 160.3% | AB$_2$O$_4$ | S |
| Sr$_2$TiO$_4$ | 152.8% | AB$_2$O$_4$ | S |
| SrBiO$_3$ | 141.8% | ABO$_3$ | S |
| BaZnO$_2$ | 134.2% | — | S |
| BaMn$_6$O$_{12}$ | 134.2% | — | S |
| Ca$_2$Fe$_2$O$_5$ | 127.7% | — | S |
| BaNiO$_3$ | 125.4% | ABO$_3$ | S |
| SrFe$_2$O$_4$ | 112.3% | AB$_2$O$_4$ | S |
| BaCoO$_3$ | 108.7% | ABO$_3$ | S |
| SrAl$_2$O$_4$ | 108.1% | AB$_2$O$_4$ | S |
| SrNiO$_3$ | 100.0% | ABO$_3$ | S |
| BaAl$_2$O$_4$ | 96.5% | AB$_2$O$_4$ | S |
| BaMnO$_3$ | 94.6% | ABO$_3$ | S |
| BaTi$_2$O$_5$ | 91.5% | — | S |
| BaTiO$_3$ | 91.2% | ABO$_3$ | S |
| CaCrO$_4$ | N/A | — | PB |
| MgCr$_2$O$_4$ | N/A | — | PB |

(IV) Interfacial Stability Against Support Material Testing

The 34 candidate compounds identified in step (III) above were tested against Al$_2$O$_3$ to check their interfacial stability against the support material. For example, SrNiO$_3$ reacts with Al$_2$O$_3$ in the following manner: 0.5 SrNiO$_3$+0.5 Al$_2$O$_3$→0.167 Ni$_3$O$_4$+0.5 SrAl$_2$O$_4$+0.167 O$_2$ with E$_{rxn}$=−0.069 eV/atom. At dilute limit of SrNiO$_3$, SrNiO$_3$ reacts as the following: 0.25 SrNiO$_3$+0.75 Al$_2$O$_3$→0.25 SrAl$_4$O$_7$+0.25 Al$_2$NiO$_4$+0.125 O$_2$ with E$_{rxn}$=−0.048 eV/atom. The two reactions between SrNiO$_3$ and Al$_2$O$_3$ were used as the reference to compare Al$_2$O$_3$ interfacial stability of the 34 compounds in Table 2 above. The results are summarized in Table 3, which shows 19 compounds that are predicted to have better or comparable interfacial stability against Al$_2$O$_3$ support. In Table 3, the "Dilute Limit" stability indicates the initial situation when dilute concentration of Cr-getter material is in contact with Al$_2$O$_3$. The "Most Stable" stability indicates situations when two reactants are in equilibrium with one another.

TABLE 3

Candidate compounds predicted to form stable interface on Al$_2$O$_3$ when compared with SrNiO$_3$

| Compounds | Al$_2$O$_3$ Stability (Dilute Limit) | Al$_2$O$_3$ Stability (Most Stable) | Crystal Structure |
|---|---|---|---|
| Ba$_2$TiO$_4$ | 194.6% | 132.7% | AB$_2$O$_4$ |
| Ba$_3$Mn$_2$O$_8$ | 219.9% | 417.6% | — |

TABLE 3-continued

Candidate compounds predicted to form stable interface on Al$_2$O$_3$ when compared with SrNiO$_3$

| Compounds | Al$_2$O$_3$ Stability (Dilute Limit) | Al$_2$O$_3$ Stability (Most Stable) | Crystal Structure |
|---|---|---|---|
| Ba$_5$Cr$_3$O$_{13}$ | 731.9% | 153.5% | — |
| Ba$_8$(Bi$_2$O$_7$)$_3$ | 1434.2% | 316.4% | — |
| BaBiO$_3$ | 138.1% | 151.6% | ABO$_3$ |
| Ca$_2$Fe$_2$O$_5$ | 134.3% | 259.2% | — |
| CaBi$_2$O$_4$ | 248.6% | 269.3% | AB$_2$O$_4$ |
| Cr(Bi$_7$O$_{12}$)$_2$ | 1295.2% | 525.8% | — |
| Mg$_3$NiO$_4$ | 101.6% | 200.0% | — |
| Mg$_6$MnO$_8$ | 185.3% | 266.2% | — |
| Sr$_2$FeO$_4$ | 173.6% | 113.1% | AB$_2$O$_4$ |
| Sr$_2$TiO$_4$ | 144.0% | 106.2% | AB$_2$O$_4$ |
| Sr$_3$Al$_2$O$_6$ | 311.7% | 124.9% | — |
| Sr$_3$Ti$_2$O$_7$ | 164.0% | 180.4% | — |
| Sr$_5$(BiO$_4$)$_3$ | 661.6% | 384.3% | — |
| Sr$_7$Mn$_4$O$_{15}$ | 678.8% | 253.1% | — |
| SrBiO$_3$ | 103.7% | 231.9% | ABO$_3$ |
| SrFe$_2$O$_4$ | 107.5% | 117.9% | AB$_2$O$_4$ |
| BaNiO$_3$ | 95.7% | 134.0% | 2$^{nd}$ tier; ABO$_3$ |

Interfacial stability was also tested against additional oxides including Cr$_2$O$_3$ and Fe$_2$O$_3$. It would be beneficial to have good interfacial stability since the candidate materials would be deposited on to stainless steel substrate, where most common surface oxides include Fe$_2$O$_3$ and Cr$_2$O$_3$.

For example, SrNiO$_3$ reacts with Fe$_2$O$_3$ and Cr$_2$O$_3$ in the following manner:

Dilute limit: 0.4 SrNiO$_3$+0.6 Fe$_2$O$_3$→0.4 Fe$_2$NiO$_4$+0.4 SrFeO$_3$+0.1 O$_2$ (E$_{rxn}$=−0.050 eV/atom).

Most stable reaction: 0.667 SrNiO$_3$+0.333 Fe$_2$O$_3$→0.222 Ni$_3$O$_4$+0.667 SrFeO$_3$+0.056 O$_2$ (E$_{rxn}$=−0.062 eV/atom).

Dilute limit: 0.4 Cr$_2$O$_3$+0.6 SrNiO$_3$→0.2 SrCr$_2$O$_4$+0.4 SrCrO$_4$+0.6 NiO (E$_{rxn}$=−0.210 eV/atom).

Most stable reaction: 0.286 Cr$_2$O$_3$+0.714 SrNiO$_3$→0.143 Sr$_2$CrO$_4$+0.429 SrCrO$_4$+0.714 NiO (E$_{rxn}$=−0.229 eV/atom).

The results are summarized in Table 4. Table 4 summarizes six compounds that show full- or partial-improvement (vs. SrNiO$_3$) on its interfacial reactivity against Fe$_2$O$_3$ and Cr$_2$O$_3$. While Ba$_8$(Bi$_2$O$_7$)$_3$ and Sr$_3$Al$_2$O$_6$ show better interfacial stability against both Fe$_2$O$_3$ and Cr$_2$O$_3$ in all criteria, Ba$_5$Cr$_3$O$_{13}$ shows improvement on every criteria except dilute Cr$_2$O$_3$ reaction. Sr$_5$(BiO$_4$)$_3$, Sr$_7$Mn$_4$O$_{15}$, and BaNiO$_3$ do not show improvement (vs. SrNiO$_3$) on Fe$_2$O$_3$ interfacial stability, but show good interfacial stability with Cr$_2$O$_3$. The compounds in Table 4 may be beneficially utilized if the quantity of Al$_2$O$_3$, Fe$_2$O$_3$ and/or Cr$_2$O$_3$ materials on the electrochemical cell component surface is sufficient to bind the one or more Cr-getter materials. Table shows candidate compounds stable against Al$_2$O$_3$ and predicted to form better or comparable interface with Fe$_2$O$_3$ and Cr$_2$O$_3$, when compared to SrNiO$_3$ (i.e., 1$^{st}$- and 2$^{nd}$-tiers) and 3$^{rd}$-tier compounds that are stable against Al$_2$O$_3$ and have better stability with Cr$_2$O$_3$ when compared to SrNiO$_3$, but not Fe$_2$O$_3$, and 4$^{th}$-tier compounds stable with Fe$_2$O$_3$ and Cr$_2$O$_3$ for surfaces with no Al content. The tier 4 compounds may be suitable for Al-free steel electrochemical cell components.

TABLE 4

Candidate compounds stable with $Al_2O_3$, $Fe_2O_3$, and/or $Cr_2O_3$.

| Compounds | $Fe_2O_3$ Stability (Dilute Limit) | $Fe_2O_3$ Stability (Most Stable) | $Cr_2O_3$ Stability (Dilute Limit) | $Cr_2O_3$ Stability (Most Stable) | Tier |
|---|---|---|---|---|---|
| $Ba_8(Bi_2O_7)_3$ | 281.4% | 4637.0% | 504.6% | 6898.2% | $1^{st}$ |
| $Sr_3Al_2O_6$ | 135.7% | 721.8% | 100.6% | 974.4% | $1^{st}$ |
| $Ba_5Cr_3O_{13}$ | 110% | 986.0% | 85.6% | 520.7% | $2^{nd}$ |
| $Sr_5(BiO_4)_3$ | 21.6% | 21.6% | 312.9% | 3999.7% | $3^{rd}$ |
| $Sr_7Mn_4O_{15}$ | 18.4% | 18.4% | 114.9% | 4551.1% | $3^{rd}$ |
| $BaNiO_3$ | 4.2% | 4.2% | 110.1% | 136.6% | $3^{rd}$ |
| $Ba_3CoO_5$ | 200.1% | 558.0% | 180.6% | 984.34% | $4^{th}$ |
| $Ba_4Al_2O_7$ | 381.7% | 684.7% | 219.3% | 1727.8% | $4^{th}$ |
| $Ba_2ZnO_3$ | 189.0% | 309.5% | 140.3% | 827.2% | $4^{th}$ |

(V) Doping

Effects of elemental doping were examined to identify how doping may affect Cr vapor ($CrO_3$, $CrO_4H_2$, and $CrO_3H_2$) reactions and $Al_2O_3$, $Fe_2O_3$, and $Cr_2O_3$ interfacial stabilities. 10% doping in Sr and Ni sites: i.e., $Sr_{0.9}M_{0.1}NiO_3$ and $SrNi_{0.9}M_{0.1}O_3$ was examined for M=Mg, Al, Si, Ca, Ti, V, Cr, Mn, Fe, Ni, Co, Cu, Zn, Y, Zr, Nb, Mo, Sn, Sb, Ba, W, and Bi.

For $Sr_{0.9}M_{0.1}NiO_3$ composition, M=Mg and Mo yield improvement when compared to $SrNiO_3$ regarding Cr vapor reactions. For $SrNi_{0.9}M_{0.1}NiO_3$ composition, M=Mg, Sr, and Ba yield improvement when compared to $SrNiO_3$ regarding Cr vapor reactions. Table 5 summarizes the findings on doped $SrNiO_3$ compositions reacting with Cr—O—(H) species. Table 5 further shows Al2O3 stability results. The studied compounds show improvement in "most stable" reactions with $Al_2O_3$, but do not exhibit improvement at the "dilute limit" with $Al_2O_3$. This means that the doped compositions may not form as stable interfacial structure initially compared with pristine $SrNiO_3$, but eventually, the interface will become more stable by carrying out experimental procedure that drives the reaction toward its equilibrium (e.g., mild heat treatment, etc.).

TABLE 5

Doped compositions that can enhance Cr vapor reactions, when compared to $SrNiO_3$ and their $Al_2O_3$ reactions

| Compounds | Improvement vs. $SrNiO_3$ on Cr vapor reactions | $Al_2O_3$ Stability (Dilute Limit) | $Al_2O_3$ Stability (Most Stable) |
|---|---|---|---|
| $Sr_{0.9}Mg_{0.1}NiO_3$ | 109.1% | 83.1% | 115.1% |
| $Sr_{0.9}Mo_{0.1}NiO_3$ | 104.1% | 78.2% | 103.9% |
| $SrNi_{0.9}Mg_{0.1}O_3$ | 116.7% | 84.0% | 113.8% |
| $Sr_{1.1}Ni_{0.9}O_3$ | 103.8% | 94.9% | 121.1% |
| $SrNi_{0.9}Ba_{0.1}O_3$ | 101.8% | 93.6% | 120.8% |

The stability of the candidates from Table 5 was studied also with respect to $Fe_2O_3$ and $Cr_2O_3$ stability. Table 6 summarizes the results. As can be seen from Table 6, each doped species exhibited different behavior. For example, $SrNi_{0.9}Ba_{0.1}O_3$ shows stability for both $Fe_2O_3$ and $Cr_2O_3$ at most stable thermodynamic equilibrium. Other species such as $Sr_{0.9}Mo_{0.1}NiO_3$ do not show improvement when in contact with $Cr_2O_3$.

TABLE 6

$Fe_2O_3$ and $Cr_2O_3$ reactions doped $SrNiO_3$ composition in comparison to $SrNiO_3$

| Compounds | $Fe_2O_3$ Stability (Dilute Limit) | $Fe_2O_3$ Stability (Most Stable) | $Cr_2O_3$ Stability (Dilute Limit) | $Cr_2O_3$ Stability (Most Stable) |
|---|---|---|---|---|
| $Sr_{0.9}Mg_{0.1}NiO_3$ | 75.0% | 117.6% | 119.3% | 76.1% |
| $Sr_{0.9}Mo_{0.1}NiO_3$ | 74.8% | 234.2% | 78.7% | 96.4% |
| $SrNi_{0.9}Mg_{0.1}O_3$ | 74.8% | 119.8% | 123.2% | 74.5% |
| $Sr_{1.1}Ni_{0.9}O_3$ | 85.1% | 130.6% | 99.7% | 112.0% |
| $SrNi_{0.9}Ba_{0.1}O_3$ | 77.1% | 123.3% | 72.3% | 109.8% |

As can be seen in Tables 5 and 6, Mg, Mo, and Ba doping on $SrNiO_3$ structure, as well as off-stoichiometric $Sr_{1.1}Ni_{0.9}O_3$, may help with Cr scavenging reactions ranging from 1 to 17%, when compared to pristine materials. The doped structures eventually form stable interface with $Al_2O_3$ support, more careful tuning may be needed if metallic support would be used for these compositions. For example, $Sr_{0.9}Mo_{0.1}NiO_3$ may not be ideal for stainless steel that contains $Cr_2O_3$ as dominant surface oxide species. While doping $SrNiO_3$ may bring some additional improvements, other oxide materials described above may lead to more significant improvement in terms of Cr vapor reactions and interfacial stability with either $Al_2O_3$ or stainless steel support.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrochemical system comprising:
   a chromium-containing surface; and
   a component having a bulk portion and a surface portion, the surface portion comprising a chromium vapor scavenger having a formula (I):

$$A_xB_yO_z \qquad (I),$$

where

A is Ba, Ca, Mg, or Sr, or a combination thereof,

B is Al, Bi, C, Cu, Fe, Mn, Ni, Ti, Y, or Zn, or a combination thereof, x is a number selected from 1 to 8, y is a number selected from 1 to 64, and z is a number selected from 1 to 103, excluding $ABO_3$, the system having a first state of releasing chromium vapor species from the chromium-containing surface and a second state of the scavenger of formula (I) scavenging the chromium vapor species and forming a material binding the chromium from the chromium vapor species.

2. The system of claim 1, further comprising a third state of regenerating the scavenger by removing the material by one or more gas agents.

3. The system of claim 1, wherein the material binding the chromium from the chromium vapor species has a formula (IV):

$$M_xCr_yO_z \quad (IV),$$

where

M is an alkaline earth metal, a post-transition metal, or a transition metal, and x, y, z is each independently any number between 1 and 12.

4. The system of claim 1, wherein the scavenger includes at least two different compounds of the formula (I).

5. The system of claim 1, wherein the scavenger includes nanoparticles in the size of about 0.1-1 μm.

6. The system of claim 1, wherein the scavenger has a cubic crystal structure.

7. The system of claim 1, wherein the electrochemical system is a fuel cell.

* * * * *